(12) United States Patent
Han

(10) Patent No.: US 6,419,235 B1
(45) Date of Patent: Jul. 16, 2002

(54) SEGMENTED OBTURATOR RING

(75) Inventor: Seungeuk Han, Fort Lee, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/570,955

(22) Filed: May 15, 2000

Related U.S. Application Data

(60) Provisional application No. 60/134,773, filed on May 18, 1999.

(51) Int. Cl.$^7$ ................................................. F16J 13/56
(52) U.S. Cl. ........................................................ 277/546
(58) Field of Search .................................. 277/493, 543, 277/546, 547, 548

(56) References Cited

U.S. PATENT DOCUMENTS

| | | | |
|---|---|---|---|
| 2,846,281 A | * | 8/1958 | Szigeti |
| 3,726,219 A | * | 4/1973 | Bolick |
| 4,901,623 A | * | 2/1990 | Lee |
| 4,907,513 A | * | 3/1990 | Manion et al. |
| 5,056,406 A | * | 10/1991 | Pinson |

* cited by examiner

Primary Examiner—Robert J. Sandy
Assistant Examiner—Karlenad Schwing
(74) Attorney, Agent, or Firm—Michael Sachs; John Moran

(57) ABSTRACT

Obturator ring comprising two or more pieces each being a little larger than semicircle of the projectile obturator ring groove circumference. Each piece at natural position has equal or smaller radius than the radius of the obturator ring groove of a projectile; therefore, each piece expands to be in the projectile groove. Thickness and height of each piece is dependent on projectile's obturator ring groove geometry. The overlap and the radius ensures each piece performs its own grip function independent to the completion of the Segmented Obturator Ring (SOR). SOR seals the expanding propellant gases in the tube optimizing the effectiveness of the propellant while the projectile moves along the gun tube with SOR. After launch, the SOR is totally separated from the projectile minimizing drag effects on and maximizing stability of projectile to enhance dispersion impacts of the warhead.

8 Claims, 5 Drawing Sheets

SEGMENTED OBTURATOR RING

RELATED APPLICATIONS

This application claims benefit of filing date May 18, 1999 of provisional application No. 60/134,773, the entire file wrapper contents of which application is herewith incorporated by reference as though fully set forth herein at length.

GOVERNMENT INTEREST

The invention described herein may be manufactured, used, or licensed by or for the U.S. Government for U.S. Government purposes.

BACKGROUND OF THE INVENTION

1. Field of Invention

The invention applies to the field of systems and for apparatus designed and installed to seal high pressure gas during the launch of a projectile from a barrel or tube and to stay free from hanging on the projectile body after the launch. Such design allows the projectile to have good muzzle velocity and better impact dispersions. In the past, such devices or appurtenances have been identified in the industry as obturator or obturator rings.

2. Background of Invention

The specific problem solved by the invention is to eliminate the hanging problem found in the use of current one piece obturator rings with projectile launches. Currently, one piece circular shaped obturator rings exist. Such a design raises the potential of ring hanging on the projectile body as the said projectile exits the tube or barrel. When an obturator ring hangs to the projectile, it increases drag and decreases stability of the projectile, which normally increases impact dispersions.

Obturator ring hanging around the projectile at low pressure launching is common in one piece ring designs.

Accordingly, it is an object of this invention to eliminate the ring hanging problems by the use of a two or a multi-piece obturator ring.

Still another object of this invention is to provide a two or a multi-piece obturator ring that fastens on the projectile with its own elasticity without using glue or mechanical methods to join the two or multi-segments.

Finally, an objective of this invention is to provide the SOR concept to a multiple of projectiles to enable the 60 mm, 81 mm and 120 mm mortar rounds. Other objects will appear hereinafter.

SUMMARY OF INVENTION

It has now been discovered that the above and other objects of the present invention may be accomplished in the following manner.

Specifically, design and test work have proven that a little longer than a half-circular arc of elastic ring has its own gripping force and stay on the projectile obturator ring groove that has a bigger diameter than the ring's own. Therefore, the two or multi-piece rings can remain on the obturator ring groove of the projectile without the use of glue, clips or other means of fasteners. The two or multi-pieces which comprise the obturator ring have stoppers to allow them to be positioned evenly on the obturator ring groove of a projectile. The two or multi-pieces obturator ring (SOR) will expand inside a gun tube due to the high pressure gas and disengages each other to seal the gap between the projectile and inner wall of a gun tube to maximize the chamber pressure.

At the muzzle, the two or multi-pieces obturator ring will stay on or separate from the projectile body; thus eliminating ring hanging potentials (on projectile other than the ring groove) to minimize air disturbance. during projectile flight.

BRIEF DESCRIPTION OF THE DRAWINGS

For a more complete understanding of the invention, reference is hereby made to the drawings of a two pieces obturator ring as an example of SOR which are described as follows.

DETAILED DESCRIPTION OF THE PREFERRED EMBODIMENT

Figure 1:
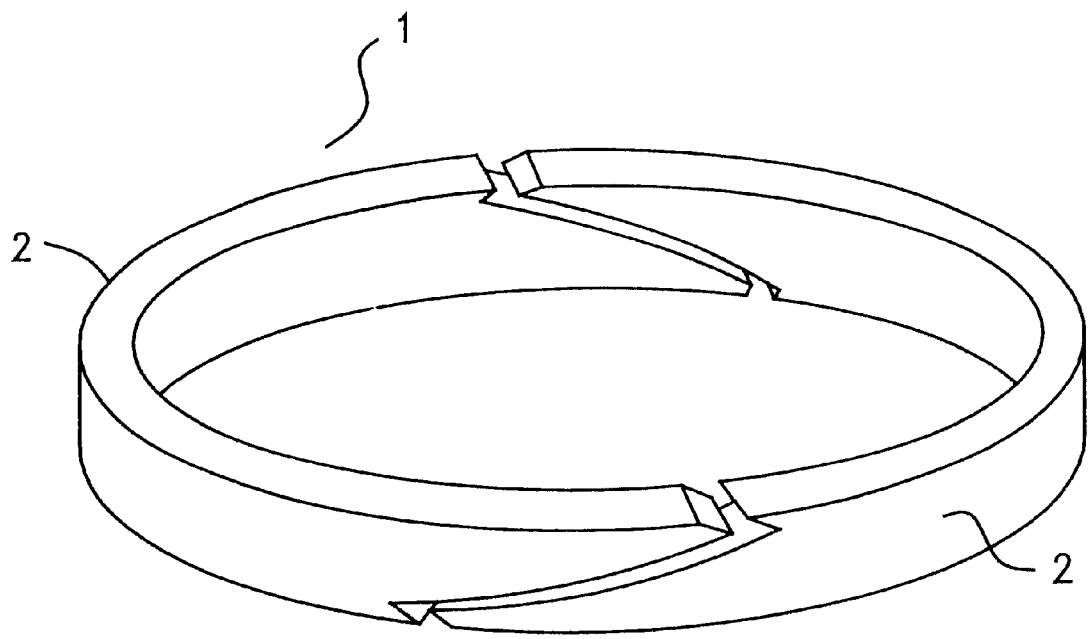
FIG. 1 is a three dimensional sketch of the obturator ring formed from two identical pieces Segmented Obturator Ring (SOR).
Figure 2:
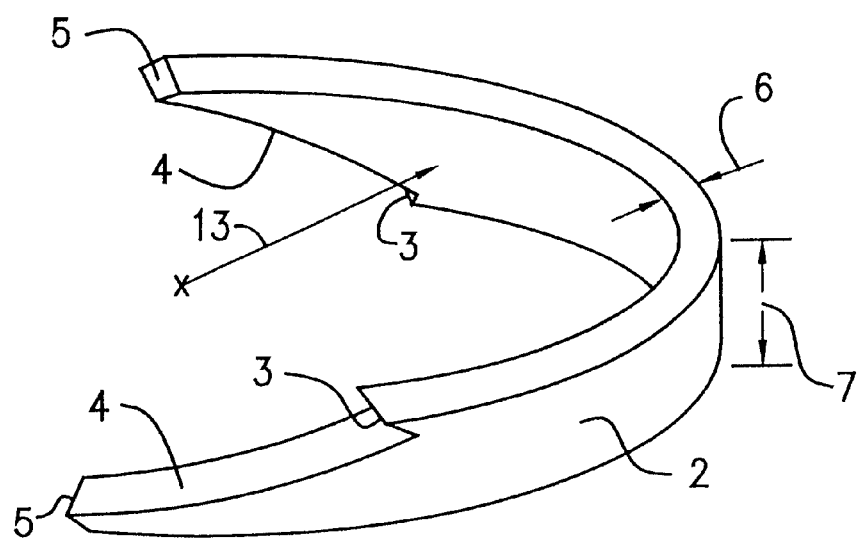
FIG. 2 is a sketch of one of the identical pieces of the Segmented Obturator Ring (SOR).

Shown at FIG. 1 is a two identical pieces Segmented Obturator Ring (SOR) 1. In particular, FIG. 1 shows the semi-circular two pieces 2 which comprise the two pieces 2 obturator ring (SOR) 1. FIG. 2 shows that each piece 2 has a stopper 3 into which the tip 5 of the SOR 1 moves along the overlap rail 4 to engage into the stopper 3. Each piece 2 has the inner radius 13 at FIGS. 2 and 4 which is a dependent on how strong the grip force must be. Using FIGS. 2, 3 and 6, the thickness 6 of each ring 2 is dependent on the projectile's obturator ring groove 11 geometry; likewise so is the height 7 shown at FIG. 2.

Figure 3:
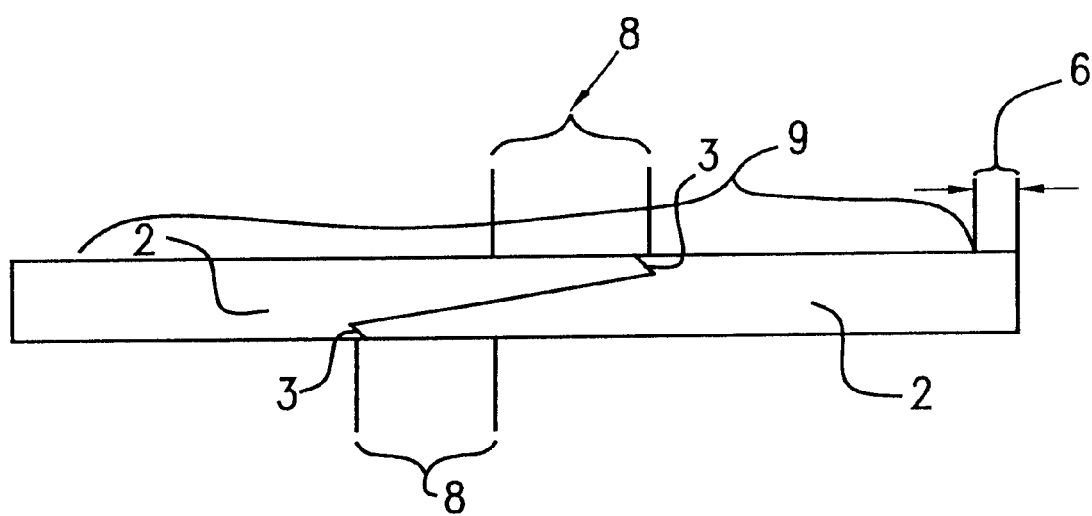
FIG. 3 is a cross-section slice across the finalized connection of the two identical pieces obturator ring showing the overlap rails when SOR is installed on a projectile obturator ring groove.

FIG. 3 shows the tips 5 of the two rings of the SOR 1 fully engaged into the stoppers 3. The overlap 8 and the inner diameter 13 insure each piece 2 performs its own grip function independent to the completion of the SOR 1. The lengths of these overlap 8 and inner diameter 13 are dependents on how strong the grip force must be for each piece 2.

The grip insures that the SOR 1 stays on the obturator ring groove 11 of a projectile 9. The SOR 1 inner diameter 13 at FIGS. 2 and 4 should be equal or smaller than the radius of the obturator ring groove 11 of a projectile 9 to perform grip force.

Figure 4:
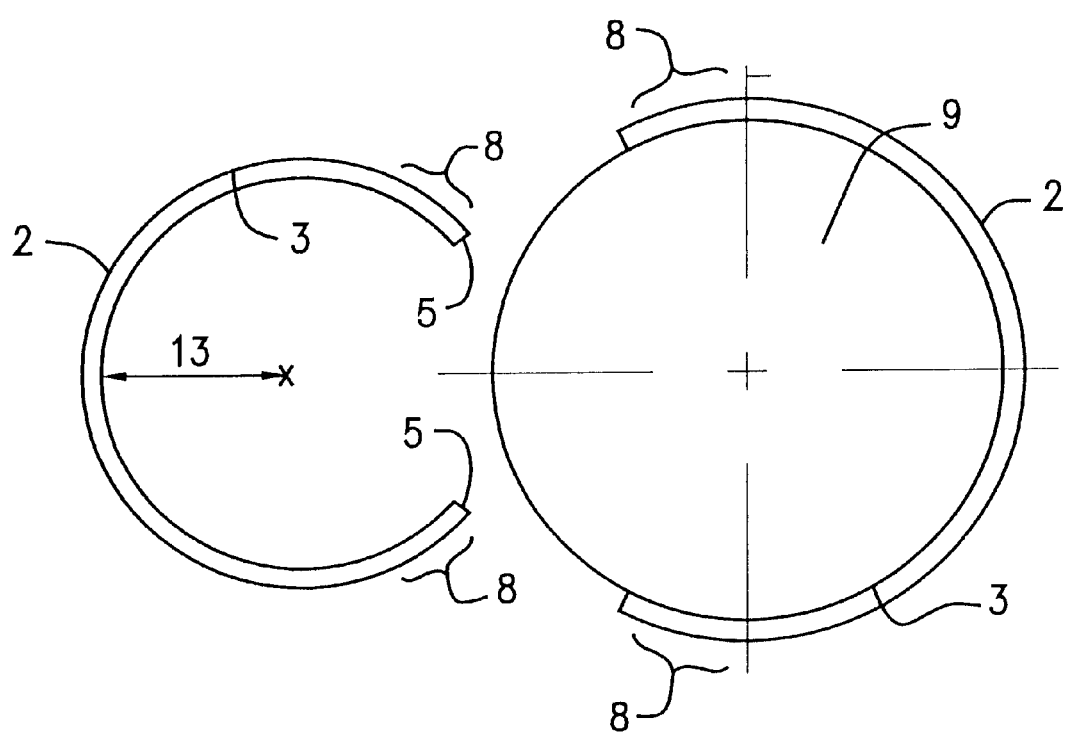
FIG. 4 is a cross-sectional view of a projectile at the obturator ring groove. It depicts one ring installed while the second is about to be installed.

FIG. 4 teaches that at the natural position, each piece 2 has an equal or smaller inner radius 13 than the radius of the obturator ring groove 11 shown also at FIGS. 5, 6, 7, 8, of the projectile 9. Therefore, each piece 2 has to be expanded to be on the projectile groove 11. Because of the overlap 8 at FIG. 3 and inner radius 13 of the FIGS. 2 and 4, each piece 2 of the SOR 1 can stay in the groove 11 independent to each other. To engage the two pieces 2 to form a SOR 1 with consistent shape each time, the tip 5 at FIGS. 2 and 4 must meet the stopper 3 on both sides each time.

Operational Concept

Figure 5:
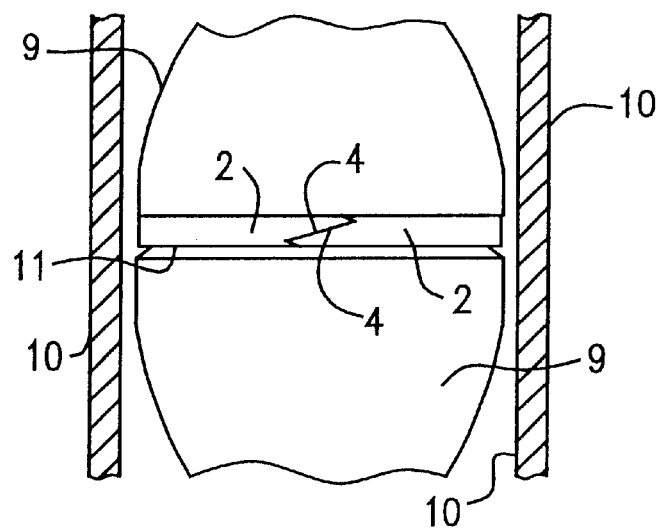
FIG. 5 is a sketch which depicts SOR engaged and placed in the obturator ring groove of a projectile to be fired from a gun tube.

FIGS. 3, 5 depict two rings 2 engaged to each other to form the SOR 1 and placed in the obturator ring groove 11 of a projectile 9. The mating surfaces 4, stoppers 3 and tips 5 of each piece 2 are fully contacting to form complete SOR 1.

Figure 6:
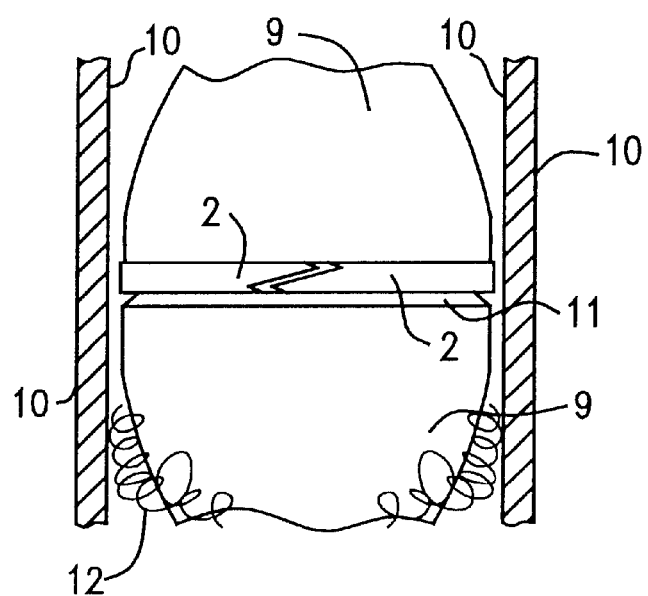
FIG. 6 is a sketch showing the activation of the SOR by expanded gas activity to seal the gap between projectile and gun tube wall.

FIG. 6 shows that upon the firing of the projectile 9 the rapidly expanding gas 12 in the tube 10 activates the SOR with the two pieces 2 now starting to separate toward the wall of the gun tube 10.

Figure 7:
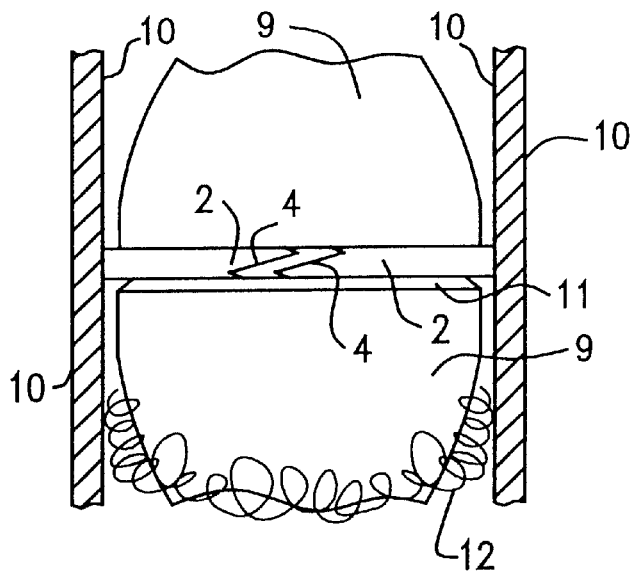
FIG. 7 is a sketch depicting the separated SOR, sealing the expanding propellant gases.

FIG. 7 shows the propellant charge has started to burn and the area behind the obturator ring 11 pressurizing. The initial bypassing gases 12 allow the SOR 1 to separate into two pieces 2. These separated pieces 2 are pushed against the gun wall 10 and seal the gap between the projectile 9 and the gun wall 10 to prevent further gas 12 leakage. This action optimizes the effectiveness of the projectile 9. The projectile 9 moves forward along the gun tube 10 with SOR 1.

Figure 8:
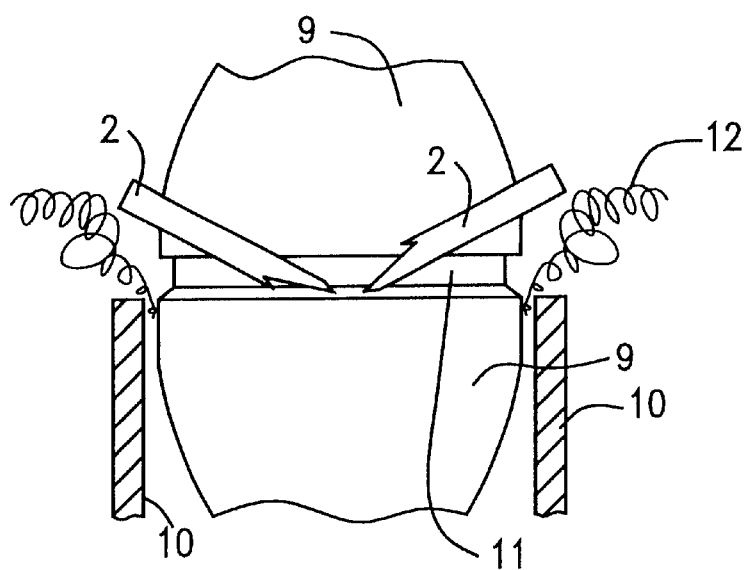
FIG. 8 is a sketch showing the SOR is separated and clear of the projectile body.

FIG. 8 shows the SOR 1 is blown away from the projectile 9 at the muzzle site by the expanded gases 12. The two pieces 2 of the SOR 1 become totally separated from the projectile body 9 and the projectile 9 is free from the SOR 1.

Thus, it is apparent that in accordance with the present invention, a functional design that fully satisfies the objectives aims and advantages is set forth above. While the invention has been described in conjunction with a specific embodiment, it is evident that many alternatives, modifications and variations will become evident to those skilled in the art in light of the foregoing description. Accordingly, it is intended that the present invention embrace all such alterations, modifications, and variations as fall within the spirit and broad scope of the appended claims.

What is claimed is:

1. An obturator ring to be secured to a projectile that is designed to be launched from within a gun tube having an inner wall and a muzzle, for sealing a pressurized gas within the gun tube during launch, comprising:

a plurality of ring segments that overlap, prior to launch, in an engagement position around a groove formed in the projectile:

wherein, during launch, the plurality of ring segments separate under the effect of the pressurized gas, and are forced against the inner wall of the gun tube to form a seal between the projectile and the gun tube; and wherein the plurality of ring segments become totally separated from the projectile upon exiting the muzzle of the gun tube.

2. An obturator ring according to claim 1, wherein the plurality of ring segments are made of elastic material.

3. An obturator ring according to claim 1, wherein each of the plurality of ring segments is independently self-gripping around part of the groove prior to launch.

4. An obturator ring according to claim 1, wherein the plurality of ring segments include two ring segments.

5. An obturator ring according to claim 4, wherein the two ring segments are arcuately shaped.

6. An obturator ring according to claim 5, wherein the two ring segments include a first ring segment and a second ring segment;

wherein the first ring segment includes a stopper and a tip;

wherein the second ring segment includes a stopper and a tip; and wherein when the two ring segments are in the engagement position around the projectile, the stopper of the first ring segment engages the tip of the second ring segment, and the stopper of the second ring segment engages the tip of the first ring segment.

7. An obturator ring according to claim 6, wherein the first ring segment has an inner radius;

wherein the second ring segment has an inner radius; and wherein the inner radii of the first and second ring segments are substantially equal.

8. An obturator ring according to claim 7, wherein the groove is circularly shaped and has an outer radius; and wherein the inner radii of the first and second ring segments are smaller than the outer radius of the groove.

* * * * *